United States Patent
Vargha et al.

[11] 3,821,270
[45] June 28, 1974

[54] NEW 2-SULPHONYLOXY-ETHYLAMINO DERIVATIVES

[75] Inventors: Laszlo Vargha; Tibo Horvath; Maria Halasz; Endre Csanyi; Boris Dumbovich, all of Budapest, Hungary

[73] Assignee: Chinoin Gyogyszer- Es Vegyeszeti Termekek Gyara Rt., Budapest, Hungary

[22] Filed: Jan. 29, 1971

[21] Appl. No.: 111,089

[52] U.S. Cl. ......... 260/456 A, 260/430, 260/435 R, 260/652 R, 424/303
[51] Int. Cl. ............. C07c 143/38, C07c 143/26, A61k 27/00
[58] Field of Search .............................. 260/456 A

[56] References Cited
UNITED STATES PATENTS

| | | | |
|---|---|---|---|
| 2,775,608 | 12/1956 | Sprague et al. | 260/456 A |
| 2,825,736 | 3/1958 | Cope | 260/456 A |
| 2,883,410 | 4/1959 | Bloom | 260/456 A |
| 2,889,351 | 6/1959 | Bloom | 260/456 A |
| 3,189,632 | 6/1965 | Howath et al. | 260/456 A |
| 3,277,144 | 10/1966 | Tishler | 260/456 A |
| 3,542,840 | 11/1970 | Porter | 260/456 A |

FOREIGN PATENTS OR APPLICATIONS

| | | | |
|---|---|---|---|
| 662,645 | 12/1951 | Great Britain | 260/456 A |

*Primary Examiner*—Joseph E. Evans
*Attorney, Agent, or Firm*—Blum, Moscovitz, Friedman, Blum & Kaplan

[57] ABSTRACT

2-Sulphonyloxy-ethylamino derivatives and salts thereof having the formula

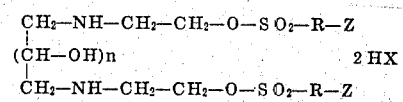

wherein $n$ is an integer from 1 to 4, R represents an unsubstituted or a with one or more Z groups substituted aryl, aralkyl or cycloalkyl group, Z represents a hydrogen or halogen atom or a methyl, methoxy or nitro group and X stands for a pharmaceutically acceptable inorganic or organic acid residue, which possess favourable cytostatic properties.

3 Claims, No Drawings

NEW 2-SULPHONYLOXY-ETHYLAMINO DERIVATIVES

The invention relates to certain new 2-sulphonyloxy-ethylamino derivatives.

The U.S. Pat. No. 3,189,632 relates to alkanesulphonyloxy-ethylamino derivatives of alkanes or oxyalkanes, consisting of 3–6 membered carbon-chains and bearing the substituent group of the formula $$R - SO_2 - O - CH_2 - CH_2 - NH -$$

(wherein R stands for an alkyl radical containing 1–3 carbon atoms) which compounds show cytostatic effects.

It has been found according to the present invention that the 2-sulphonyloxy-ethylamino derivatives having the general formula

wherein $n$ is an integer from 1 to 4, R represents an unsubstituted or a with one or more Z groups substituted aryl, aralkyl or cyclo-alkyl group, Z represents a hydrogen or halogen atom, or a methyl, methoxy or nitro group and X represents a pharmaceutically acceptable inorganic or organic acid residue - particularly the tetritol or hexitol derivatives e.g. the derivatives of erythritol, threitol, mannitol, dulcitol, sorbitol etc. possess favourable cytostatic properties.

It has been found further according to the present invention that the above 2-sulphonyloxy-ethylamino derivatives having the general formula (I) may be prepared by forming 2-sulphonyloxy-ethylamino group having the general formula $$Z - R - SO_2 - O - CH_2 - CH_2 - NH -$$
(II)

wherein R and Z have the same meaning as stated above - on the two terminal carbon atoms of the sugar alcohol having three to six carbon atoms.

The preparation of compounds having the general formula I, that is the formation of groups having the general formula II may be performed by reacting the diethyleneimino derivative of the sugar alcohol with an unsubstituted or a substituted aryl, aralkyl or cycloalkyl sulphonic acid.

According to a further feature of the present invention the compounds having the general formula I may also be prepared by reacting the di-(2-halogeno-ethylamino) derivative of the sugar alcohol with the salt, preferably a heavy metal salt of the unsubstituted or substituted aryl, aralkyl or cycloalkyl sulphonic acid. In the reaction a polar solvent, preferably acetonitrile, is used as solvent and the heavy metal salt is for instance silver or lead sulphonate.

According to the invention the 2-sulphonyloxy-ethylamino derivatives may further be prepared by the formation of groups having the general formula II on sugar alcohol derivatives the hydroxyl groups of which are partly or entirely protected, e.g. are acetalized or acylated followed by the removal of the protecting group by methods known to those skilled in the art.

The biological activity of the compounds having the general formula I is illustrated by the test results - including toxicity ($LD_{50}$), tumour growth inhibitory action ($x$), prolonged life span ($xx$), therapeutical index ($TI_{ip} = LD_{50}/ED_{50}$), effect on the blood count — of some derivatives listed below. The investigated compounds were:

A, 4-di-(2-benzenesulphonyloxy-ethylamino)-1,4-dideoxyerythritol-dibenzenesulphonate B, 4-di-(2-p-chloro-benzenesulphonyloxy-ethylamino)-1,4-dideoxy-erthritol-di-p-chloro-benzenesulphonate C, 4-di-(2-p-nitrobenzenesulphonyloxy-ethylamino)-1,4-dideoxy-erythritol-di-p-nitrobenzenesulphonate D, 4-di-(2-benzilsulphonyloxy-ethylamino)-1,4-dideoxyerthritol-dibenzilsulphonate E, 4-di-(2-cyclohexylsulphonyloxy-ethylamino)-1,4-dideoxy-erythritol-dicyclohexylsulphonate

| Symbol of compound | $LD_{50}$ mg/kg i.p. mouse | $TI_{i.p.}$ on Yoshida sc. sarcoma | Effect on blood picture[*] | |
|---|---|---|---|---|
| | | | direction | intensity |
| A | 50 | 100 | lymphoid | strong |
| B | 45 | 15 | mixed | strong |
| C | 32 | 18 | lymphoid | medium |
| D | 37 | 33 | lymphoid | medium |
| E | 88 | 35 | lymphoid | medium |

[*] The effect on the blood picture was tested with a single $LD_{50}/5$ intraperitoneal (i.p.) dose in rats, the direction and intensity of the effect on the blood picture means in absolute numbers the percentage decrease in the lymphocyte and granulocyte counts (strong effect: 70–90 %, medium effect: 50–70 % decrease).

| Symbol of | Rat tumours | | | Mouse tumours | | |
|---|---|---|---|---|---|---|
| | Walker[*] sc.carc. | Guerin[*] sc.carc. | Shay[] chloroleuk | Ehrlich[] asc.carc. lymphoma | NK/LY[**] asc. compound | Sarcoma-180[*] s.c. |
| A | −92 | −43 | +36 | +52 | +54 | −42 |
| B | −99 | 0 | +400 | +280 | +100 | 0 |
| C | −99 | −42 | +60 | +105 | +80 | 0 |
| D | −98 | −48 | +17 | +186 | +38 | −38 |
| E | −96 | 0 | 0 | +56 | +73 | −15 |

[*] = Degree of tumour growth inhibition in %
[**] = Prolongation of the life-span in %

The applied doses were $5 \times LD_{50}/20$ or $5 \times LD_{50}/10$ administered intraperitoneally.

The compounds of the present invention are finished into the form of powder ampoules or coated tablets.

The recommended daily doses of the compounds for clinical use according to this invention are in average 0.02 to 0.2 g.

The following Examples serve to illustrate the invention, but are not to be regarded as limiting it in any way:

EXAMPLE 1

The suspension of 14.88 g. of 1,4-di-(2-bromo-ethylamino)-1,4-dideoxy-erythritol-dihydrobromide (Acta Chim. Hung. 19, 295/1959/) is boiled and stirred in the solution of 47.7 g. of silver benzenesulphonate in 220 ml. of anhydrous acetonitrile for 45 hours. The cooled reaction mixture is filtered and the isolated salts washed with 300 ml. of acetonitrile. The filter-cake is eluted with portions of 400 ml. of hot anhydrous methanol. The methanolic filtrates are combined, treated with hydrogen sulphide, clarified with charcoal and then concentrated in vacuo at 40°C bath temperature. The needle-crystalline product precipitated on the addition of 120 ml. of ether is isolated, yield 17.8 g. (74 percent). The product is then recrystallized from a methanol-ether mixture (10 ml. + 20 ml/g.). The product thus obtained is 1,4-di-(2-benzenesulphonyloxy-ethylamino)-1,4-dideoxy-erythritol-dibenzenesulphonate. Yield 16.7 g. (69.5 %), m.p.: 163°–164°C (under decomposition).

Preparation of the silver salt of the sulphonic acid:

The corresponding sulphonic chloride is boiled with anhydrous methanol (6 ml./g.) for 6 to 10 hours till the developement of methyl-chloride ceases. The solvent is then evaporated in vacuo, the obtained sulphonic acid is dissolved in water (3–8 ml./g.) and then neutralized by the addition of an equivalent amount of silver carbonate under constant stirring. The solution of the salt is clarified with charcoal and filtered to give a clear solution — if necessary concentrated in vacuo — and the crystalline product is precipitated by the addition of isopropanol or acetone, the liquid drawn off, the residue washed with ether and dried in vacuo protected from light. If necessary for the purpose of purification the product is dissolved in anhydrous acetonitrile (5–6 ml./g.), filtered, the filtrate evaporated to dryness in vacuo or the salt is precipitated from the concentrated solution by the addition of isopropanol, acetone or ether. In this way the silver salt of the desired sulphonic acid is obtained with 90 percent yield.

EXAMPLE 2

9.92 g. of 1,4-di-(2-bromo-ethylamino)-1,4-dideoxyerthritol-dihydrobromide are boiled under stirring with the solution of 55.5 g. of silver p-toluenesulphonate in 300 ml. of anhydrous acetonitrile for 21 hours. The cooled mixture is filtered ans the salt mixture washed with portions of acetonitrile. The filter cake is eluted with portions of 500 ml. of hot methanol, the combined filtrates are treated with hydrogen sulphide, clarified with charcoal and filtered while hot. The crystalline product which precipitates from the solution on cooling is filtered, washed with acetonitrile (12.1 g., m.p.: 181°–183°C). The mother lye is evaporated to dryness in vacuo at 40°C bath temperature, the evaporation residue is mixed with 100 ml. of acetonitrile and the precipitated crystalline product is isolated (4.3 g.). After recrystallization of the crude product (15.4 g., 89.5 percent) from anhydrous ethanol (95 ml./g.) the obtained product is 14.1 g. of 1,4-di(2-p-tosyloxyethylamino)-1,4-dideoxy-erythritol-di-p-tosylate, m.p.: 183°–184°C (under decomposition).

EXAMPLE 3

18.2 g. of 1,4-diethyleneimino-1,4-dideoxy-erythritol-dimesylate are dissolved in 18.2 ml (27 g) of 100 percent methanesulphonic acid and stirred at 100°–102°C for 2.5 hours. When the temperature has reached 98°C the reaction becomes exothermic and the developement of heat may be compensated by the short interruption of heating or by air cooling. When the reaction is over, the reaction mixture is mixed with 135 ml. of anhydrous methanol and heated rapidly to achieve complete dissolution. The solution is then filtered through a glass filter and cooled as quickly as possible. The precipitated crystalline product is isolated after a short cooling with ice water, washed with 2 × 8 ml. of methanol and 5 × 10 ml. of anhydrous isopropanol and dried in vacuo at 40°C. The obtained product is 25.6 g. (92 %) of 1,4-di-(2-mesyloxy-ethylamino)-1,4-dideoxy-erythritoldimesylate, m.p.: 142°–143°C.

Preparation of 1,4-diethyleneimino-1,4-dideoxy-erythritol-dimesylate:

To a mixture of 100 g. of methanesulphonic acid and 300 ml. of water 85 g. of powdered 1,4-diethyleneimino-1,4-dideoxy-erythritol is added under constant stirring at a temperature between −5° and 0°C (Acta Chim. Hung. 19, 2954/1959/). The solution is filtered clear through a glass filter and the filtrate is mixed with 3600 ml. of isopropanol under constant stirring. The precipitated crystalline product is filtered, washed with isopropanol and ether, dried in vacuo at 20°C. Yield: 172.5 g (93 percent), m.p.: 217°–218°C (under decomposition). The product may also be crystallized from water - acetone, water - acetonitrile mixtures and from dimethylformamide.

EXAMPLE 4

5.16 g of 1,4-diethyleneimino-1,4-dideoxy-erythritol-di-p-tosylate (m.p.: 216°C under decomposition) are boiled under constant stirring with a solution of 6 g. of toluenesulphonic acid in 40 ml. of nitromethane for 2 hours. The crystalline product precipitated from the reaction mixture on cooling is filtered, washed with nitromethane and ether, 6.2 g., m.p.: 170°–174°C. The mother lye is concentrated in vacuo thus another 1.05 g. of the product is obtained. The crude product is twice recrystallized from ethanol. Thus 5.9 g. of 1,4-di-(2-p-tosyloxy-ethylamino)-1,4-dideoxy-erythritol-di-p-tosylate are obtained; m.p.: 183°–184°C.

EXAMPLE 5

4.96 g. of 1,4-di-(2-bromo-ethylamino)-1,4-dideoxyerythritol-dihydrobromide are boiled under constant stirring with the solution of 17.7 g. of silver p-methoxy-benzene-sulphonate in 180 ml. of anhydrous acetonitrile for 64 hours. After the completion of the reaction the cooled reaction mixture is filtered and the salts are washed with acetonitrile. The filter cake is then eluted with portions of 500 ml. of hot anhydrous methanol, the combined portions of filtrate are treated with hydrogen sulphide, clarified with charcoal and concentrated in vacuo at a bath temperature of 40°C. The precipitated crystalline product is filtered, washed with ethanol; yield: 5.45 g. (59 %), m.p.: 170°–172°C. The crude product is crystallized from a mixture of methylcellosolve-ether (4.5 ml. + 30 ml./g.), the obtained product is 5.25 g. (56.9 percent of 1,4-di-(2-p-methoxy-benzenesulphonyloxy-ethylamino)-1,4-dideoxy-erythriotol-di-p-methoxybenzenesulphonate, m.p.: 171°–172°C (under decomposition).

EXAMPLE 6

3 g. of 1,4-di-(2-bromo-ethylamino)-1,4-dideoxyerythritol-dihydrobromide are boiled under constant stirring with the solution of 12.6 g. of silver 3,-4,5-trimethoxy-benzenesulphonate in 90 ml. of anhydrous acetonitrile for 30 hours. The salts precipitated from the reaction mixture are separated by filtration and washed with 70 ml. of acetonitrile. The silver is removed from the filtrate by treatment with hydrogen sulphide, the solution clarified with charcoal and then evaporated to dryness in vacuo at a bath temperature of 40°C. The evaporation residue is mixed with 3 × 20 ml. of ether, the ether is decanted, the residual gum is dissolved in 3 × 50 ml. of hot anhydrous isopropanol and the solvent is each time decanted from the gum which precipitates on cooling. The product thus obtained recrystallizes when mixed again with anhydrous ether, it is drawn off and washed with ether and dried in vacuo over phosphorus pentoxide at 20°C. In this way 6.25 g. (70.5 %) of 1,4-di-(2-[3,4,5-trimethoxy-benzenesulphonyloxy]-ethylamino)-1,4-dideoxy-erythritol-di-(3,4,5-trimethoxy-benzenesulphonate) is obtained, m.p.: 57°–58°C (hygroscopic). The dioxalate (m.p.: 168°C) and the dihydrochloride (m.p.: 106°–108°C) of the product is not hygroscopic.

EXAMPLE 7

9.92 g. of 1,4-di-(2-bromo-ethylamino)-1,4-dideoxyerythritol-dihydrobromide are boiled under constant stirring with the solution of 36 g. of silver p-chloro-benzenesulphonate in 200 ml. of anhydrous acetonitrile for 70 hours. After cooling the salts precipitated from the reaction mixture are separated by filtration and washed with 200 ml. of acetonitrile. The filter cake is eluted with portions of 1600 ml. of hot methanol, the methanolic fitrates are combined, treated with hydrogen sulphide, the solution clarified with charcoal and evaporated to dryness in vacuo at a bath temperature of 40°C. The crystalline evaporation residue is mixed with small amount of ethanol, filtered and washed with ether, the yield is 15.4 g. (82 percent), m.p.: 183°–185°C. The crude product is recrystallized from a mixture of dimethylsulphoxide and isopropanol, the product thus obtained is 1,4-di-(2-p-chloro-benzene-sulphonyloxyethylamino)-1,4-dideoxy-erythritol-di-p-chlorobenzenesulphonate, m.p.: 189°–190°C (under decomposition).

EXAMPLE 8

4.96 g. of 1,4-di-(2-bromo-ethylamino)-1,4-dideoxyerythritol-dihydrobromide are boiled under constant stirring with the solution of 28.2 g. of silver p-nitro-benzenesulphonate in 100 ml. of anhydrous acetonitrile for 10 hours. The cooled reaction mixture is filtered and the silver bromide is washed with portions of 300 ml. of acetonitrile. The filtrate is treated with hydrogen sulphide, clarified with charcoal and evaporated to dryness in vacuo at a bath temperature of 40°C. The syrupy evaporation residue (20 g.) is mixed with 200 ml. of anhydrous isopropanol and the product which has recrystallized on cooling is filtrated, washed with isopropanol, 3 × 8 ml. of ice water and 6 × 10 ml. of acetonitrile. The product obtained is 3.4 g. (30.9 percent) of crystalline 1,4-di-(2-p-nitro-benzenesulphonyloxy-ethylamino)-1,4-dideoxy-erythritol-di-p-nitrobenzenesulphonate, m.p.: 184°–185°C (under decomposition).

EXAMPLE 9

4.96 g. of 1,4-di-(2-bromo-ethylamino)-1,4-dideoxy-D,L-threitol-dihydrobromide are boiled under constant stirring with the solution of 28.2 g. of silver p-nitro-benzenesulphonate in 100 ml. of anhydrous acetonitrile for 10 hours. The reaction mixture is worked up according to the process described in Example 8. 5.1 g.(51.9 percent) of 1,4-di-(2-p-nitro-benzenesulphonyloxy-ethylamino)-1,4-dideoxy-D,L-threitol di-p-nitrobenzene-sulphonate is obtained, m.p.: 176°–178°C (under decomposition).

EXAMPLE 10

4.96 g. of 1,4-di-(2-bromo-ethylamino)-1,4-dideoxyerythritol-dihydrobromide are boiled under constant stirring with the solution of 16.8 g. of silver benzyl-sulphonate in 160 ml. of anhydrous acetonitrile for 20 hours. The salts precipitated on cooling from the reaction mixture are separated by filtration and washed with portions of 250 ml. of acetonitrile. The filter cake is eluted with 1×250 ml. and 2×100 ml. of hot anhydrous methanol. The methanolic solutions are combined, treated with hydrogen sulphide to precipitate the silver, clarified with charcoal and concentrated in vacuo at a bath temperature of 40°C. The crystalline product precipitated on cooling is filtrated, washed with isopropanol and ether. 5.9 g. (68.5 %) of the product with a melting point of 187°–189°C is obtained. The crude product is recrystallized from methylcellosolve (7 ml./g.) or from a mixture of dimethylsulphoxide-isopropanol (4 ml. - 12 ml./g.). 5.3 g. (61.7 %) of 1,4-di-(2-benzylsulphonyloxy-ethylamino)-1,4-dideoxyerythritol dibenzylsulphonate m.p.: 189.5° C (under decomposition) are obtained.

EXAMPLE 11

4.96 g. of 1,4-di-(2-bromo-ethylamino)-1,4-dideoxyerythritol-dihydrobromide are boiled under constant stirring with the solution of 16.3 g. of silver cyclohexylsulphonate in 150 ml. of anhydrous acetonitrile for 32 hours. The reaction mixture is allowed to stand overnight, the precipitated salts are separated by filtration and washed with portions of 200 ml. of acetonitrile. The filter cake is eluted with 1 × 100 ml. and 2×50 ml. of hot anhydrous methanol. (The insoluble silver bromide is 7.25 g.). The methanolic solutions are combined, treated with hydrogen sulphide, the solution is clarified with charcoal and concentrated to 25 ml. in vacuo at a bath temperature of 40°C. The crystalline product precipitated on cooling is separated by filtration, washed with isopropanol. 6.7 g. (81 percent) of the crude product are obtained. This latter is repeatedly recrystallized from methanol (5 ml./g.). Thus 5.7 g. (69 percent) of 1,4-di-(2-cyclohexyl)-sulphonyloxy-ethylamino)-1,4-dideoxy-erythritol-dicyclohexyl-sulphonate with a melting point of 188°–189°C (under decomposition) is obtained. The compound may be crystallized also from ethanol, and mixtures of dimethylformamide - acetone and dimethylformamide-ethanol respectively.

EXAMPLE 12

3.39 g. of 1,6-di-(2-bromo-ethylamino)-1,6-dideoxy-dulcitol-dihydrobromide are boiled under constant stirring with the solution of 10 g. of silver benzylsulphonate in 90 ml. of anhydrous acetonitrile for 20 hours. The mixture is cooled, the precipitated salts separated by filtration and washed with 3×20 ml. of acetonitrile. The filter cake is eluted with 1×250 ml. and 2×100 ml. of hot anhydrous methanol. The methanolic solutions are combined, treated with hydrogen sulphide, clarified with charcoal and evaporated to dryness in vacuo. The crystalline evaporation residue is mixed with isopropanol, filtered and the residue is washed with isopropanol and ether. The crude product (3.7 g., m.p.: 155°–160°C) is crystallized from a mixture of dimethyl formamide-ether (3ml. – 50 ml./g.). The obtained product is 3.09 g. (52.3 percent) of 1,6-di-(2-benzylsulphonyloxy-ethylamino)-1,6-dideoxy-dulcitol-dibenzylsulphonate, m.p.: 160°C (under decomposition).

What we claim is:

1. 2-Sulfonyloxy-ethylamino derivatives and their salts having the formula

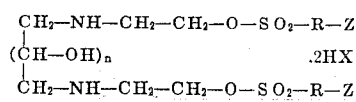 .2HX wherein $n$ is an integer from 1 to 4, RZ represents a phenyl group or a phenalkyl group having an alkyl chain of 1–3 carbon atoms, which groups may be optionally substituted by alkyl having 1–4 carbon atoms, nitro, chlorine or bromine and x stands for a pharmaceutically acceptable acid residue.

2. 2-Sulphonyloxy-ethylamino derivatives and their salts having the formula

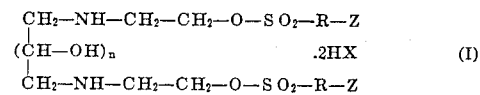 .2HX (I)

wherein $n$ is an integer from 1 to 4, RZ represents a phenyl group, or a phenylalkyl group having an alkyl chain of 1–3 carbon atoms, which groups may be optionally substituted by methyl, nitro, chlorine or bromine, and X stands for a pharmaceutically acceptable acid residue.

3. A 2-Sulphonyloxy-ethylamino derivative as defined in claim 1, wherein said derivative is the compound, 1,4, di-(2-benzenesulphonyloxy-ethylamino)-1,4-dideoxy-erythritol-dibenzene sulphonate.

* * * * *